United States Patent
Keen et al.

(10) Patent No.: US 9,458,001 B2
(45) Date of Patent: Oct. 4, 2016

(54) PALLET TRUCK ASSEMBLY

(71) Applicant: J. H. Ryder Machinery Limited, Missassauga (CA)

(72) Inventors: Mark Keen, Neustadt (CA); Michael Novak, Hillsburgh (CA); Thomas Ryder, Toronto (CA)

(73) Assignee: RYDER MATERIAL HANDLING LLC, Mississauga (CA)

( * ) Notice: Subject to any disclaimer, the term of this patent is extended or adjusted under 35 U.S.C. 154(b) by 88 days.

(21) Appl. No.: 14/133,953

(22) Filed: Dec. 19, 2013

(65) Prior Publication Data

US 2015/0014948 A1    Jan. 15, 2015

(30) Foreign Application Priority Data

Jul. 10, 2013 (CA) ..................................... 2820695

(51) Int. Cl.
*B62B 3/06* (2006.01)
*B66F 9/22* (2006.01)
*B66F 9/065* (2006.01)

(52) U.S. Cl.
CPC ............... *B66F 9/22* (2013.01); *B62B 3/0618* (2013.01); *B66F 9/065* (2013.01)

(58) Field of Classification Search
CPC ......... B62B 3/001; B62B 3/008; B62B 3/02; B62B 3/06; B62B 3/0618; B62B 2202/92; B62B 2203/20; B66B 9/07586; B66B 9/20; B66B 9/205; B66B 9/22
See application file for complete search history.

(56) References Cited

U.S. PATENT DOCUMENTS

| | | | | |
|---|---|---|---|---|
| 2,327,583 | A | * | 8/1943 | Framhein .............. B62B 3/0612 180/19.2 |
| 2,550,548 | A | * | 4/1951 | Framhein ................. B62B 3/06 254/10 C |
| 3,576,333 | A | * | 4/1971 | Danielson ............. B62B 3/0618 280/43.12 |
| 4,969,794 | A | * | 11/1990 | Larsen .................. B62B 3/0618 280/43.12 |
| 5,354,080 | A | * | 10/1994 | Jones .................. B62B 3/01612 254/2 C |
| 5,403,024 | A | * | 4/1995 | Frketic ..................... B62B 3/06 280/43.12 |
| 6,021,869 | A | * | 2/2000 | Fischer .................... B62B 3/06 187/231 |

(Continued)

OTHER PUBLICATIONS

Crown Equipment Corporation, "WP 3000 Series", 2012, brochure and specifications, 21 pgs.

*Primary Examiner* — Katy M Ebner
(74) *Attorney, Agent, or Firm* — Jenna L. Wilson; Dimock Stratton LLP

(57) ABSTRACT

A powered pallet truck with a selectable effective reduced turning radius, and an intermediate roller assembly for mounting on the powered pallet truck, are provided. The intermediate roller assembly can include a base, a linear actuator pivotably connected at a base end to the base, a linkage pivotably connected to the base, and at least one roller having an axis pivotably connected to an actuating end of the linear actuator and to the linkage, the at least one roller thus being movable between a retracted and an engagement position. The assembly can be mounted to the underside of a pallet truck fork having a load wheel. A turning radius effectively defined by a drive wheel of the pallet truck and the intermediate roller, or a turning radius effectively defined by the drive wheel and the load wheel, can be selected.

3 Claims, 6 Drawing Sheets

(56) References Cited

U.S. PATENT DOCUMENTS

| | | | | |
|---|---|---|---|---|
| 6,616,395 B2* | 9/2003 | Fransson | B60G 17/0272 | 187/222 |
| 7,114,906 B1* | 10/2006 | Baumgarner | B62B 3/06 | 280/43.12 |
| 7,226,060 B2* | 6/2007 | Hartmann | B62B 3/001 | 280/43.12 |
| 7,296,806 B2* | 11/2007 | Borrmann | B62B 3/02 | 280/43.12 |
| 7,641,011 B2* | 1/2010 | Fridlington, Jr. | B62B 3/0618 | 180/68.5 |
| 7,731,206 B2* | 6/2010 | Borrmann | B62B 3/008 | 280/47.34 |
| 8,336,913 B1* | 12/2012 | Aaseby | B60B 11/02 | 280/38 |
| 8,763,990 B2* | 7/2014 | Day | B62B 3/001 | 254/2 B |
| 8,950,759 B2* | 2/2015 | Thorsen | B62B 3/02 | 280/43.12 |
| 9,260,125 B2* | 2/2016 | Ellington | B62B 3/06 | |
| 2009/0189132 A1* | 7/2009 | Meijer | B62B 3/0618 | 180/68.5 |
| 2015/0056056 A1* | 2/2015 | Ellington | B62B 3/06 | 414/800 |
| 2015/0102274 A1* | 4/2015 | He | B62B 3/0618 | 254/2 C |

* cited by examiner

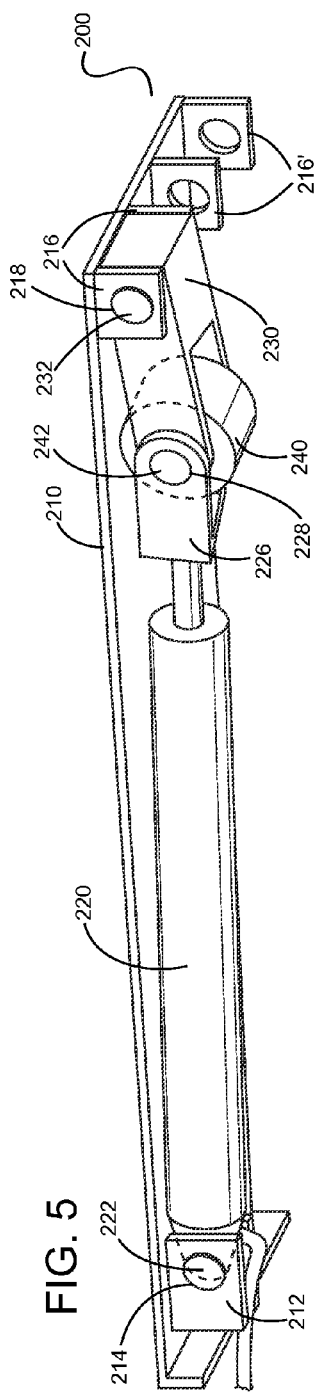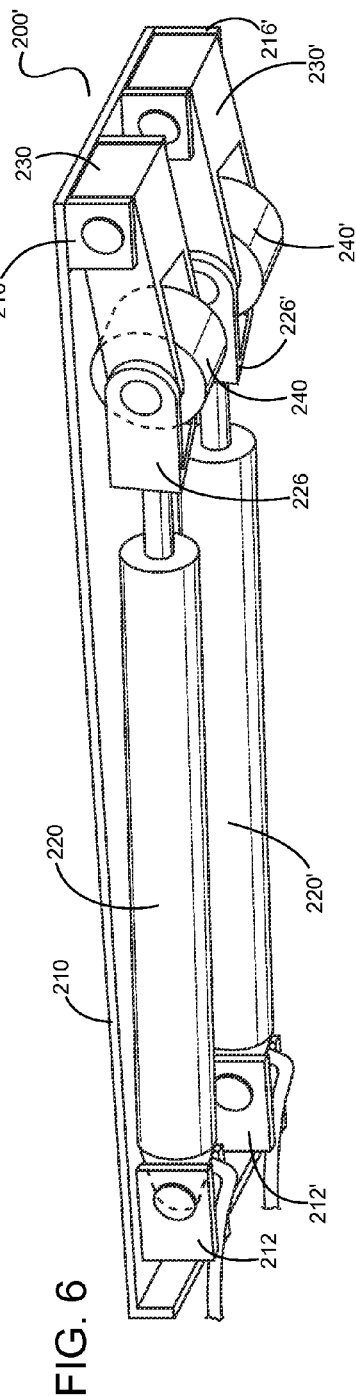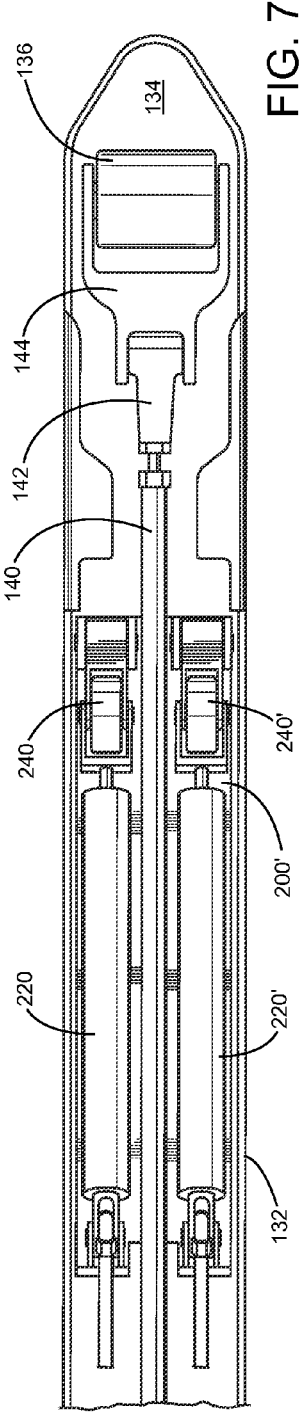

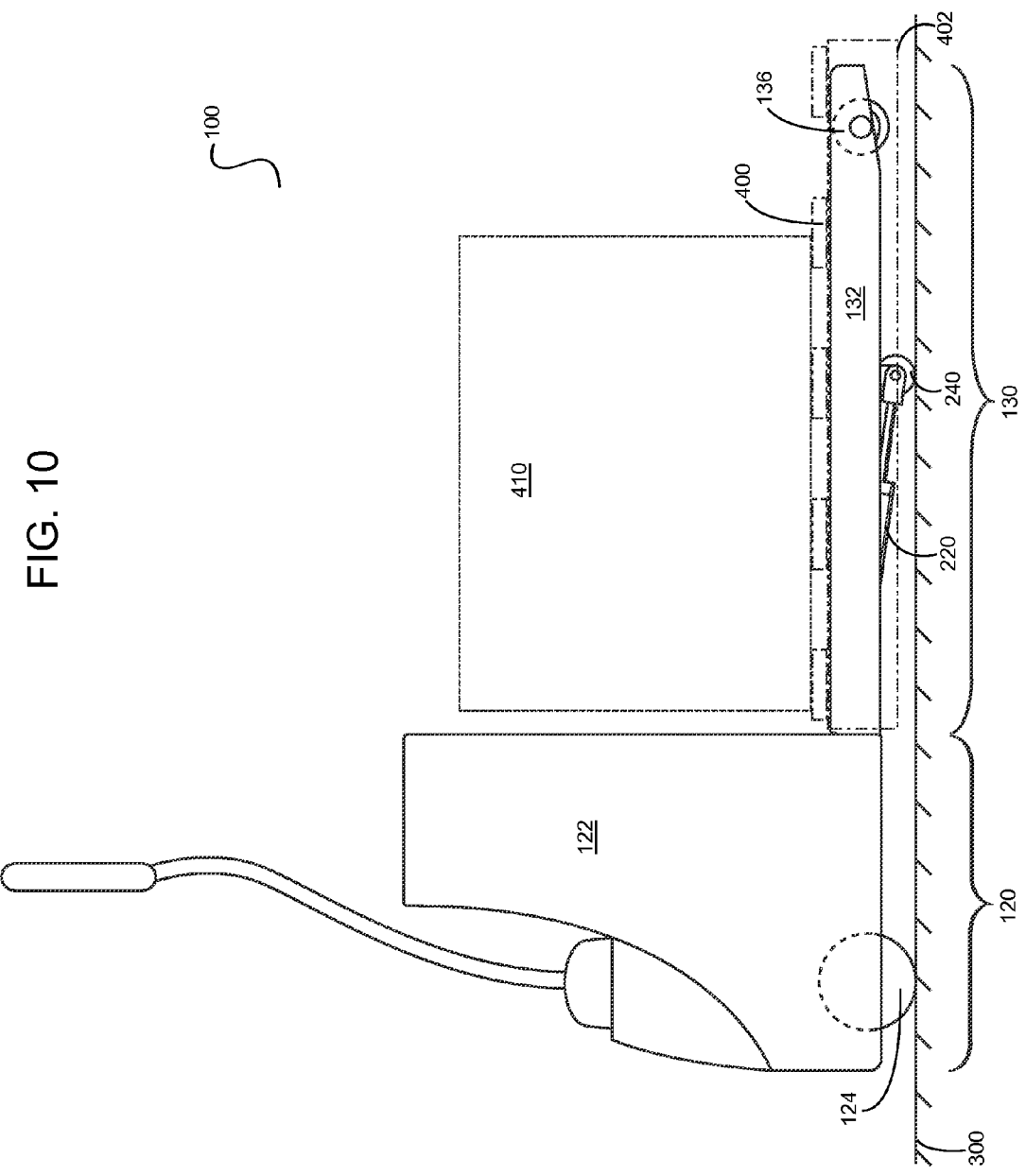

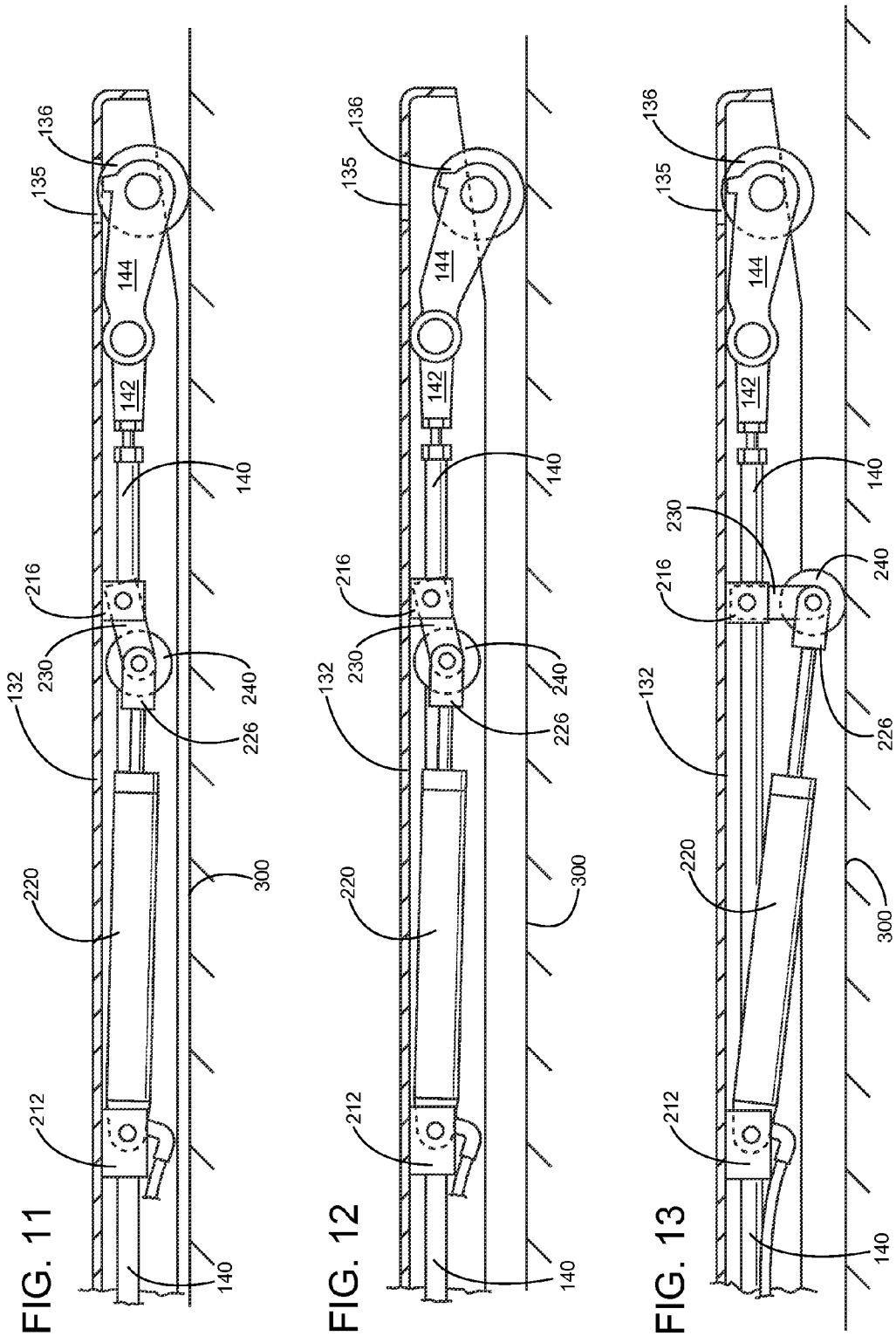

PALLET TRUCK ASSEMBLY

REFERENCE TO PRIOR APPLICATIONS

This application claims priority from Canadian Patent Application No. 2,820,695, filed Jul. 10, 2013, the entirety of which is incorporated herein by reference.

TECHNICAL FIELD

The present disclosure relates to pallet trucks and similar conveyances, and in particular to powered pallet trucks with a selectable turning radius.

TECHNICAL BACKGROUND

Pallet trucks, which are also commonly referred to as pallet jacks, pump lifts, and pump trucks, are wheeled devices used to lift and transport loaded and unloaded pallets on a fork assembly. The construction and operation of pallet trucks is known in the art. Both manual (hand-powered) and powered (motorized) pallet trucks typically employ a lift mechanism employing a linear actuator such as a hydraulic actuator, to raise the fork assembly from a lowered position to provide sufficient clearance between the lower surface of the pallet and the floor to permit travel. Each fork of the fork assembly is supported by load wheels located near the ends of the fork. Travel is controlled by the pallet truck operator, typically by a steering assembly coupled to a drive wheel; thus, the turning radius of the pallet truck is defined at least in part by the wheelbase defined by the distance between the load wheels and the drive wheel. The orientation of the load wheels is typically fixed with respect to the pallet truck; accordingly, the turning radius may be inconveniently large, with the result that the pallet truck can be difficult to maneuver in a crowded or constrained environment.

U.S. Pat. No. 8,336,913, issued to Aaseby et al., describes a steering device for decreasing a turning radius of a manual pallet jack. The steering device comprises a spring-biased wheel mounted to the underside of the jack between an extensible roller and a main wheel. When the pallet jack is in the lowered position such that it is maneuverable to engage a pallet resting on the ground, the spring-biased wheel contacts the ground and provides a shorter turning radius between it and the main wheel of the jack. When the pallet jack is moved to a raised position, however, a larger turning radius is defined by the extensible roller and the main wheel. However, it has been found that the selection of a spring with suitable compressive force can be challenging, as too weak a spring results in the spring-biased wheel losing contact with the ground, while too much spring resistance makes it difficult, but usually impossible, for the wheel to pass over the lower stringer of a pallet. Furthermore, the steering device is only capable of providing the shorter turning radius when the pallet jack is unloaded (and in the lowered position), thus limiting the utility of the steering device.

BRIEF DESCRIPTION OF THE DRAWINGS

In drawings which illustrate by way of example only embodiments of the present disclosure, in which like reference numerals describe similar items throughout the various figures.

FIG. 5 is a perspective view of a first example of an intermediate roller assembly.

FIG. 6 is a perspective view of a second example of an intermediate roller assembly.

FIG. 7 is a bottom plan view of the intermediate roller assembly of FIG. 6 mounted on a fork of the powered pallet truck of FIG. 3.

FIG. 10 is a side elevation of the pallet truck of FIG. 3 bearing a load with the intermediate roller assembly in the engagement position.

FIG. 11 is a sectional view showing the mounted intermediate roller assembly in a retracted position while the fork is in a lowered position.

FIG. 12 is a sectional view showing the mounted intermediate roller assembly in the retracted position while the fork is in a raised position.

FIG. 13 is a sectional view showing the mounted intermediate roller assembly in the engagement position while the fork is in a raised position.

DETAILED DESCRIPTION OF THE INVENTION

Figures 1, 2:
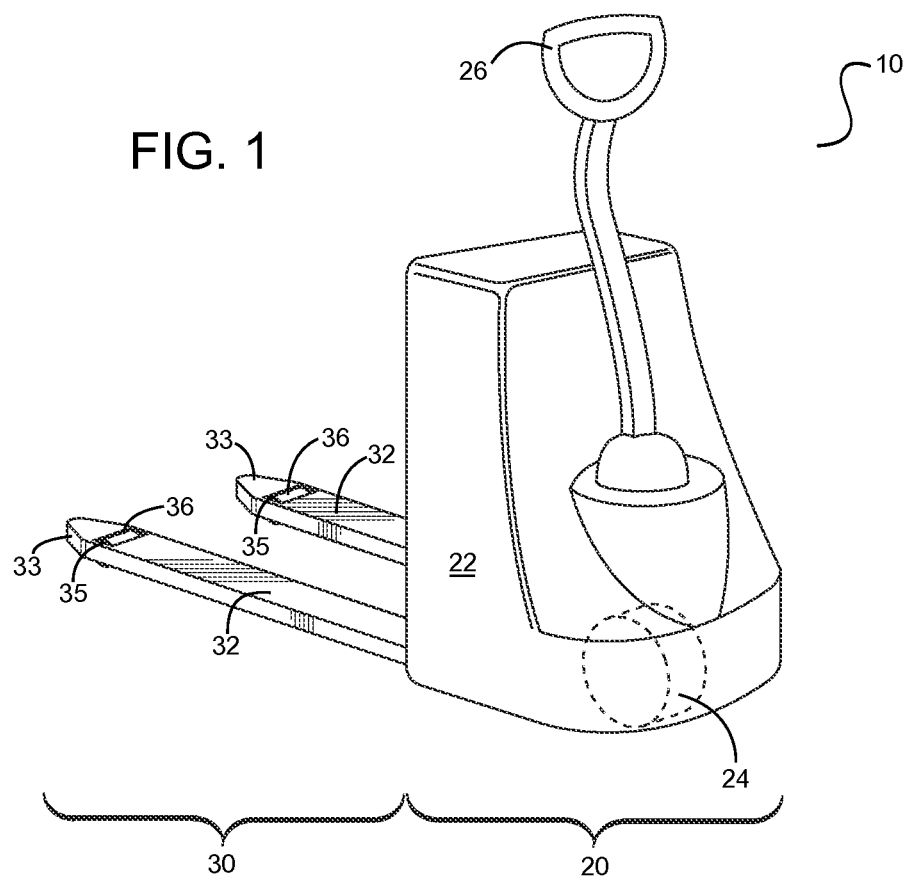
FIG. 1 is a perspective view of a powered pallet truck.
FIG. 2 is a top plan view of the powered pallet truck of FIG. 1.

The embodiments described herein provide a powered pallet truck provided with an intermediate roller assembly permitting operation of the pallet truck with a selectable turning radius, and further provide an intermediate roller assembly that can be used to retrofit a pallet truck.

There is accordingly provided an intermediate roller assembly for mounting on an underside of a fork of a powered pallet truck, the intermediate roller assembly comprising: a base; a linear actuator pivotably connected at a base end to the base; a linkage pivotably connected to the base; and at least one roller having an axis pivotably connected to an actuating end of the linear actuator and to the linkage, the at least one roller thus being movable between a retracted and an engagement position.

In one aspect, the base is adapted for fastening to the underside of the fork. In another aspect, the linear actuator comprises a hydraulic cylinder. In still another aspect, the intermediate roller assembly is installed on the underside of the fork of the powered pallet truck and disposed between at least one drive wheel of the powered pallet truck and at least one load wheel of the fork, such that when the at least one roller is in the engagement position and in contact with a work surface and the at least one load wheel is not in contact with the work surface, a turning radius of the powered pallet truck is determined by a distance between the at least one roller and the at least one drive wheel.

There is also provided a powered pallet truck, including: a head section including a drive unit and at least one drive wheel; a fork assembly comprising at least one fork, each fork comprising at least one load wheel movable between a retracted position and an extended position, a first turning radius of the powered pallet truck on a work surface being determined by a distance between the at least one drive wheel and the at least one load wheel when the at least one load wheel is engaged with the work surface; and at least one intermediate roller disposed on the at least one fork between the at least one load wheel and the at least one drive wheel, the at least one intermediate roller being movable between an engagement position and a retracted position, a second turning radius of the powered pallet truck being determined by a distance between the at least one drive wheel and the at least one intermediate roller when in the engagement position.

In one aspect, the fork assembly is movable between a lowered position and a raised position, the at least one intermediate roller being movable to the engagement position while the fork assembly is in the raised position. In another aspect, the at least one load wheel is engaged with the work surface when the fork assembly is in the lowered position and the at least one load wheel is in the retracted position; the at least one load wheel is engaged with the work surface when the fork assembly is in the raised position and the at least one load wheel is in the extended position; and the at least one load wheel is not engaged with the work surface when the fork assembly is in the raised position and the at least one load wheel is in the retracted position.

In still a further aspect, the powered pallet truck comprises: a first hydraulic actuator pivotably coupled to an axle of the at least one load wheel to move the at least one load wheel between a retracted position and an extended position; a second hydraulic actuator pivotably coupled to an axle of the at least one intermediate roller to move the at least one intermediate roller between the retracted position and the engagement position; a hydraulic system providing a hydraulic pressure source; and a diverter valve in communication with the hydraulic system and the first and second hydraulic actuators to selectively place either the first or second hydraulic actuator in fluid communication with the hydraulic pressure source.

In a further aspect, when the first hydraulic actuator is selected and actuated, the at least one load wheel is moved to the extended position and the at least one intermediate roller is in the retracted position; and when the second hydraulic actuator is selected and actuated, the at least one intermediate roller is in the engagement position and the at least one load wheel is in the retracted position. In still a further aspect, when neither the first hydraulic actuator nor the second hydraulic actuator is actuated, both the at least one load wheel and the at least one intermediate roller is in the retracted position.

There is also provided a powered pallet truck, comprising: a chassis comprising at least one drive wheel; a fork assembly mounted on the chassis and comprising a pair of forks each supported by at least one load wheel, the fork assembly having a loaded state, wherein in the loaded state, a load is borne by the fork assembly and the fork assembly is in a raised position; and an intermediate roller assembly mounted on each fork between the at least one load wheel and the at least one drive wheel, the intermediate roller assembly comprising at least one intermediate roller movable by a linear actuator between a retracted position in which the at least one intermediate roller is not engaged with a work surface and an engagement position in which the at least one intermediate roller is engaged with the work surface while the fork assembly is in the loaded state, a turning radius of the powered pallet truck on the work surface being determined by a distance between the at least one drive wheel and the at least one intermediate roller when in the engagement position with the fork assembly in the loaded state.

In one aspect, the intermediate roller assembly comprises: a base; the linear actuator, pivotably connected at a base end to the base; and a linkage pivotably connected to the base; the at least one intermediate roller having an axis pivotably connected to an actuating end of the linear actuator and to the linkage. In still another aspect, the linear actuator is a hydraulic actuator. In yet a further aspect, the powered pallet truck further comprises a hydraulic system providing a hydraulic pressure source to the hydraulic actuator. In still a further aspect, the at least one load wheel is movable by a further hydraulic actuator between an engagement position and a retracted position, the further hydraulic actuator being connected to the hydraulic system; and the hydraulic system comprising a diverter valve in communication with the hydraulic actuator of the intermediate roller assembly and the further hydraulic actuator to selectively place either hydraulic actuator in fluid communication with the hydraulic pressure source.

FIG. 1 illustrates a typical powered pallet truck 10 comprising a head or control section 20 and a fork assembly 30. The head section 20 can include a frame or chassis housing the drive unit for the pallet truck; this can include an AC drive unit and motor. The head section also includes the steering assembly 26 used by the operator to control travel by the pallet truck. The steering assembly is operatively coupled to the drive wheel 24. In the examples illustrated and described herein, a single drive wheel 24 is shown; however, it will be appreciated by those skilled in the art that the head section 20 may include multiple wheels, for example a drive wheelset; for ease of exposition, however, a single drive wheel 24 is referenced in these examples. It will be appreciated by those skilled in the art, though, that the concepts and the intermediate roller assemblies may be adapted for use with pallet trucks having more than one main wheel. The head section 20 also includes a mechanism for controlling one or more lift mechanisms used to raise and lower the fork assembly 30. The control mechanism may be a switch or toggle used to control the motor driving the lift mechanism(s). An example of a powered pallet truck is the Model WP 3000 distributed by Crown Equipment Corporation of New Bremen, Ohio, U.S.A.

The fork assembly typically includes a pair of forks 32, and is illustrated as such herein. Each fork 32 is provided with at least one load wheel 36. Load wheels may be provided in sets, rather than as the single load wheel illustrated here; again, those skilled in the art will appreciate that the embodiments herein extend to such configurations. When the load wheel 36 contacts the floor or other work surface on which the pallet truck is travelling, the load wheel 36 bears at least part of the load carried by the forks 32. Thus, the load wheel 36 is typically disposed at or near the distal end 33 of the fork 32. In the example of FIG. 1, the wheels 36 are visible through apertures 35 provided in the fork surface that accommodate the wheels 36 while still permitting free rotation when the wheels 36 are in a retracted position. Again, the typical fork assembly includes a plurality (usually two) forks; however, the concepts and embodiments herein apply to alternative fork assembly configurations.

The degree of extension or retraction of the load wheel 36, the amount of clearance beneath the forks 32, and the length, width and separation of the forks 32 of the fork assembly, are determined generally by the application: namely, the size and type of the pallets or other load the pallet truck is intended to lift and transport. While standard dimensions of pallets have been more or less established, pallet trucks may be customized as necessary to accommodate specific job requirements. Regardless of individual specifications, though, the handling of the pallet truck is affected by the pallet trucks' effective turning radius or turning circle, i.e., the smallest radius or diameter of the smallest circular turn that the pallet truck can make. The turning radius is determined at least in part by the size of the pallet truck's wheelbase, or the distance between the load wheels and the drive wheel. This is illustrated in the plan view of FIG. 2, which illustrates the wheelbase d measured as the longitudinal distance between the load wheels 36 (indicated by line b) and the drive wheel 24 (indicated by line a), with the wheels shown in phantom. The greater the wheelbase, the greater the turning radius; this typically adversely affects the maneuverability of the pallet truck.

Figure 3:
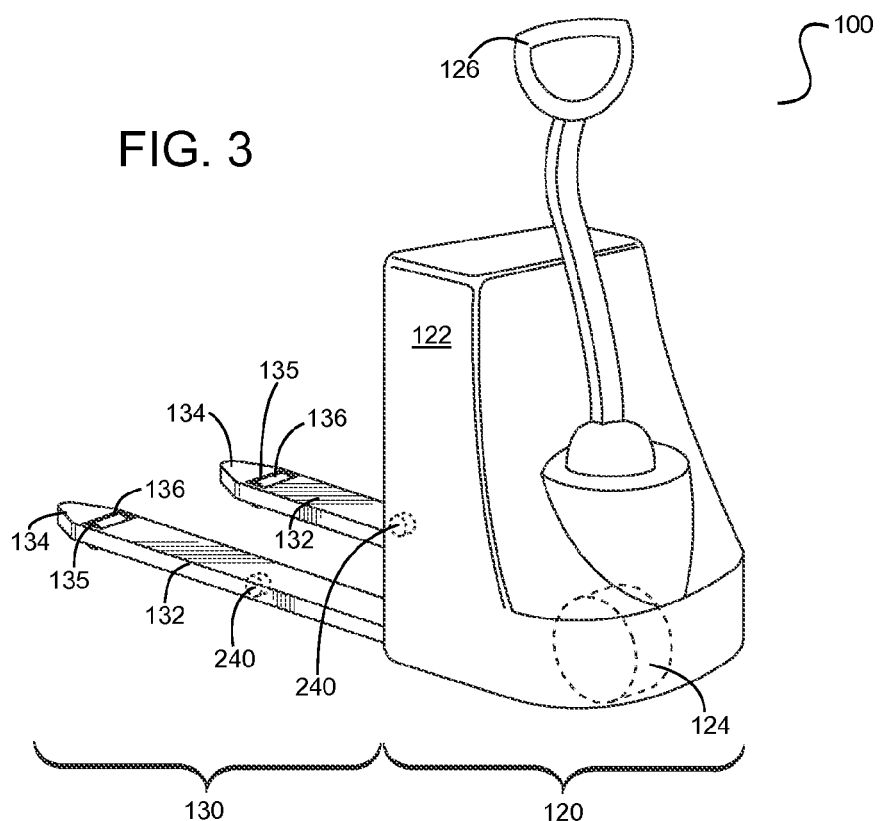
FIG. 3 is a perspective view of a powered pallet truck provided with an intermediate roller assembly.
Figure 4:
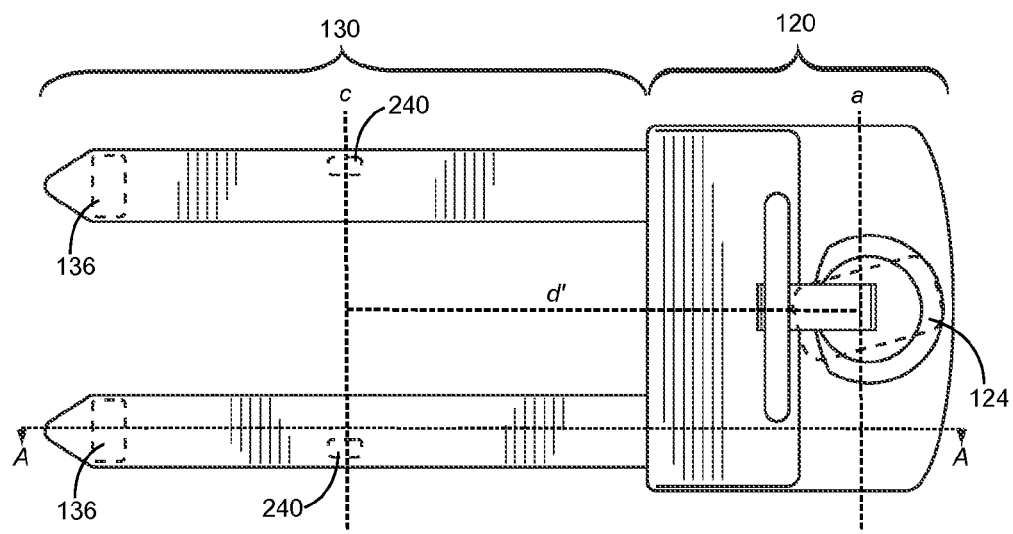
FIG. 4 is a plan view of the powered pallet truck of FIG. 3.

Accordingly, an intermediate roller assembly (illustrated in FIG. 5 and following figures) is provided to selectively alter the wheelbase and thus the turning radius of the pallet truck. The position of the intermediate rollers of the intermediate roller assembly is shown in FIGS. 3 and 4. FIG. 3 provides a perspective view of a pallet truck 100, which, as above, includes a head section 120 and fork assembly 130. The head section 120 includes the drive assembly 126, chassis or frame 122, and drive wheel 124. The fork assembly includes forks 132, load wheels 136 positioned at distal ends 134, and apertures 135. In addition, at least one intermediate roller 240 is provided at an intermediate location between the load wheel 135 and the drive wheel 124, on at least one, but most advantageously all, forks of the fork assembly 130. As will be described below, in certain states the intermediate rollers 240, rather than the load wheels 135, bear the load of the pallet truck 100. The intermediate location can be determined according to the typical load distribution on the fork assembly.

FIG. 4 is a plan view of the pallet truck 100 provided with the intermediate roller assembly, showing the position of the intermediate rollers 240 with respect to the load wheels 136 and drive wheel 124 in phantom. When the intermediate rollers 240, rather than the load wheels 136, bear the load on the fork assembly 130, the wheelbase d' is the distance between the intermediate rollers 240 (indicated by line c) and the drive wheel (indicated by line a), which is less than the wheelbase d when the load wheels 136 are bearing the load as in FIG. 2. In one example, a pallet truck having an average turning circle of about 126" was fitted with intermediate rollers assemblies reducing the turning circle to about 82", or a reduction in the turning circle of about 35%.

The intermediate roller assembly 200 is illustrated in FIG. 5. The intermediate roller assembly 200 in this example is mounted on a base 210, which can be a steel plate or other frame that is adapted or adaptable for fastening to the underside of a fork 132. A hydraulic strut or cylinder 220 or other suitable linear actuator is pivotably mounted at its base end to the base 210. In the example of FIG. 5, a bearing provided on the base end of the hydraulic cylinder 220 is mounted on an axle 222, itself mounted to the base 210 by a bracket 212 including a bearing 214 provided therein. Other pivoting connections between the hydraulic cylinder 220 and the base 210 may be used.

The rod or actuating end of the hydraulic cylinder is provided with a pivoting connection to an intermediate roller 240. In this example, a linkage 226, here a bracket or clevis linkage, extends from the cylinder rod and receives the axle 242 of the intermediate roller 240 in a bearing 228. The axle 242 of the intermediate roller 240 is thus displaced on actuation of the hydraulic cylinder 220. Motion of the intermediate roller axle 242 is constrained by a linkage 230, which itself is pivotably connected to both the intermediate roller 240 and the base 210. In the example of FIG. 5, an axle 232 of the linkage 230 is mounted in a bracket 216, which itself is fixed to the base 210. The axle 242 of the intermediate roller 240 is also mounted on the linkage 230. The linkage 230 and the bracket 226 thus permit free rotation of the intermediate roller 240, while controlling the displacement of the axle 242 with respect to the base 210, and thus to the fork 132 when the assembly 200 is mounted thereto.

FIG. 5 also illustrates a spare bracket 216', which, as can be seen in the example of FIG. 6 below, can be used in a dual hydraulic cylinder embodiment of the intermediate roller assembly 200'. In this dual hydraulic cylinder version, a pair of hydraulic cylinders 220, 220' is pivotably mounted via brackets 212, 212', and to intermediate rollers 240, 240' via brackets 226, 226'. The intermediate rollers 240, 240' are also rotatably mounted on their corresponding linkage 230, 230' as described above, and the linkages 230, 230' are pivotably mounted on brackets 216, 216'. In these examples, the base 210 can be a steel plate, and the various components described above used to connect the linar actuator and the rollers can be machined metal components. However, the manufacture of these components and the materials used can be selected from any suitable technique and material known to those skilled in the art. While specific examples of pivoting connections are illustrated here, other pivoting connection arrangements may be suitably employed and are also known to those skilled in the art.

FIG. 7 depicts the example intermediate roller assembly 200' mounted on the underside of a fork 132, thus illustrating the relative position of the intermediate rollers 240, 240' with respect to the load wheel 136. In this example, an actuator 140 used to control the position of the load wheel 136 is disposed between the hydraulic cylinders 220, 220' of the assembly 200'. In the case of a single hydraulic cylinder 220 as in the example assembly 200, the hydraulic cylinder 220 would simply be positioned alongside the load wheel actuator 140. The load wheel actuator 140 here is a hydraulic actuator, connected by a linkage 142 that is pivotably mounted to the wheel brace 144 bearing the axle of the load wheel 136. Actuation of the load wheel actuator 140 causes the axle of the load wheel 136 to be displaced with respect to the fork 132, thus enabling the load wheel 136 to be raised or lowered with respect to the work surface. In the following examples, reference is had to the single-hydraulic cylinder variant of FIG. 5, but it will be appreciated that these examples also apply to the dual-hydraulic cylinder variant.

Since the positions of both the load wheel 136 and intermediate roller 240 are controlled by linear actuators, the mechanism used to control the load wheel actuator 140 can be adapted to control the intermediate roller actuator 220 as well. For instance, as both actuators 140, 220 in this example are hydraulic cylinders, the same hydraulic system may be employed for both actuators 140, 220, with a diverter valve (not shown) interposed between the hydraulic pressure source and the cylinders to select either the load wheel actuator 140 or the intermediate roller actuator 220, or neither. Then, on actuation of a switch or toggle provided for operator control and in operative communication with the diverter valve, hydraulic pressure can be diverted from one actuator to the other by altering the fluid communication between the hydraulic system and the actuators 140, 220, and pressure released on the other actuator. Alternatively, pressure can be released on both actuators. The configuration of a typical hydraulic system for a pallet truck will be known to those skilled in the art. The diverter valve can be located in the system as the last valve through which the hydraulic fluid passes through to reach the load wheel and intermediate roller actuators, and thus after any other filters or valves in the system. In this manner an existing pallet truck's hydraulic system can be advantageously fitted with an assembly 200 (or 200') after manufacture without requiring installation of a separate hydraulic system. In some examples, however, at least a final filter is interposed between the diverter valve and the actuators 140, 220 to assist in removal of any remaining particulate matter in the hydraulic fluid before entry into the actuators 140, 220. Of course, in a further example (not shown), independent hydraulic systems may be provided for controlling the load wheel 136 and the intermediate roller 240.

Figure 8:
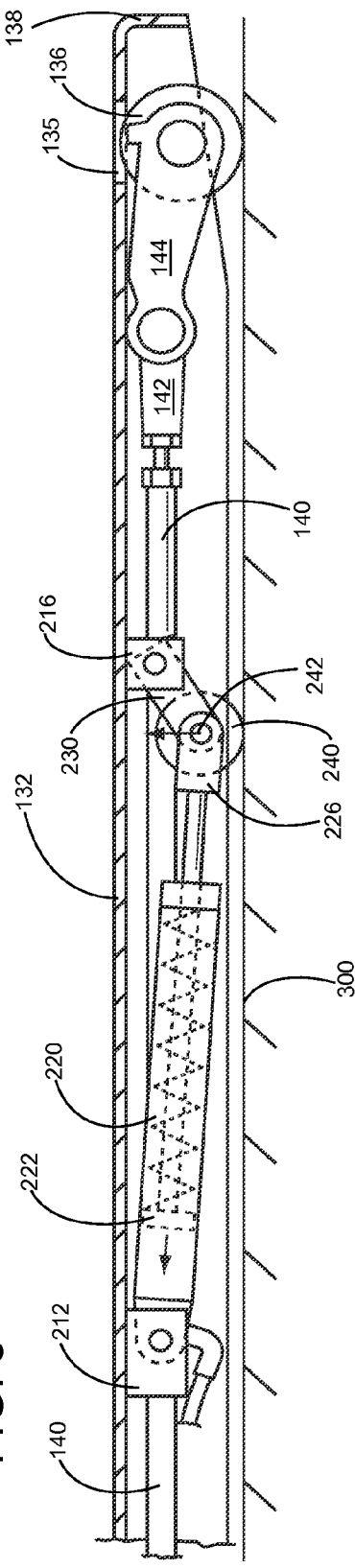
FIG. 8 is a sectional view along the line AA indicated in FIG. 4 showing intermediate roller assembly in an engagement position mounted on a fork.
Figure 9:
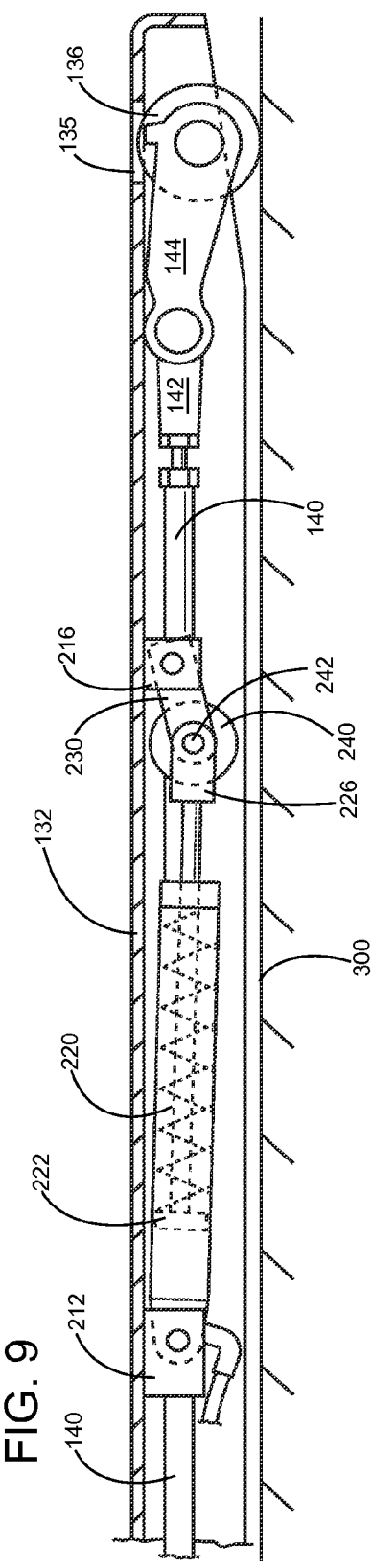
FIG. 9 is a sectional view of the mounted intermediate roller assembly of FIG. 8 in a retracted position.

FIGS. 8 and 9 illustrate the effect of actuation of the hydraulic cylinder 220 on the intermediate roller 240 in a side elevation view of the assembly 200 as mounted on the underside of the fork 132. In these figures the fork 132 is shown in a sectioned view as the fork typically includes depending side members (such as the forward depending flange 138 shown in sectioned view in FIG. 8) that provide rigidity to the fork structure and protect the load wheel 136 and actuator 140, thus obscuring these components and the assembly 200 from view. In the view of FIG. 8, it can be seen that the fork 132 is in a lowered position with respect to the work surface 300, with the load wheel 136 engaging the work surface. In addition, the intermediate roller 240 is itself in contact with the work surface 300, while the piston 222 (shown in phantom) of the hydraulic cylinder 220 travels towards the cylinder's base as shown by the arrow, indicating a return to a low pressure condition after pressure is released from the hydraulic cylinder 220. As a result of the release of pressure, the position of the axle 242 of the intermediate roller 240 is able to move upwards as indicated by the upwards arrow in FIG. 8. The intermediate roller 240 is thus movable to the position shown in FIG. 9, where it is no longer in contact with the work surface 300 and is thus in a retracted position.

FIG. 10 illustrates the pallet truck 100 with the fork assembly 130 (and thus the fork 132) in a raised position and in a loaded state, in which the load wheel 136 is in a retracted position and not in engagement with the work surface 300, and the intermediate roller 240 is in an engagement position, in engagement with the work surface 300. In this figure, the pallet truck 100 is shown bearing a load 410 on a pallet 400. It will be appreciated by those skilled in the art that as a result of diversion of hydraulic pressure to the actuator 220 of the intermediate roller assembly, the intermediate roller 240 is extended to the engagement position and pressure is released on the actuator 140 (not shown in FIG. 10) controlling the position of the load wheel 136; accordingly the load wheel 136 is shown in the retracted position. It can also be seen that in the raised position, while the lower edge of the pallet 402 clears the work surface, the intermediate roller 240 remains in contact with the work surface 300 between the slats (not shown) of the pallet 400. Conversely, when pressure is diverted from the actuator 220 and to the actuator 140 of the load wheel 136, then the load wheel 136 will be extended and the intermediate roller 240 retracted, similar to what is shown in FIG. 9. This can occur while the fork assembly remains in a raised position as in FIG. 10; thus, even in the raised position, the operator can select between engaging the load wheels 136 and the intermediate rollers 240 and thereby select a larger or smaller turning radius while the fork assembly 130 is in a raised and in a loaded condition.

FIGS. 11 to 13 illustrate a sequence of states of the fork assembly (as represented by a single fork 132), intermediate roller 240, and load wheel 136. In FIG. 11, no hydraulic pressure is applied to either the intermediate roller 240 or load wheel 136 actuators, and the fork 132 is in a lowered position. The load wheel 136 is therefore engaged with the work surface 300, while also in a retracted position, and the intermediate roller 240 is in a retracted position and not in engagement with the work surface 300. In this state, the pallet truck 100 may be carrying a load, but due to the minimal clearance between the fork 132 and the work surface 300, the pallet truck 100 would typically not be travelling with a pallet load. In this position, the pallet truck 100 would typically be in an unloaded state, and is maneuverable to engage a standard pallet resting on the work surface. In this state, however, the pallet truck 100 could be steered with a larger turning radius (as determined by the distance between the drive wheel, not shown in FIGS. 11 to 13, and the load wheel 136).

In FIG. 12, hydraulic pressure is applied to the load wheel actuator 140 and not to the intermediate roller actuator 220, and the fork 132 is in a raised position. As a result, the load wheel 136 is in an extended position and is still engaged with the work surface 300 while the intermediate roller 240, which remains in its retracted position, is not. In this state, given the greater clearance between the fork 132 and the work surface, when the pallet truck 100 is loaded, the load is raised above the ground and there would be sufficient distance between the lower surface of a pallet and the work surface to permit travel while the pallet truck 100 is bearing a pallet load, as in FIG. 10. In this state, again, the pallet truck 100 will have the larger turning radius.

In FIG. 13, the pallet truck 100 may still be in the loaded state of FIG. 10 or 12. The fork 132 is in a raised position, so again, there would be sufficient clearance underneath a loaded pallet for the pallet truck to travel. Hydraulic pressure on the load wheel actuator 140 is released, and hydraulic pressure is applied to the intermediate roller actuator 220. The intermediate roller 240 is therefore in an engagement position, in contact with the work surface 300, and the load wheel 136 is in a retracted position, and not in engagement with the work surface. In this state, then, the turning radius is effectively reduced from the states of FIGS. 11 and 12, as it is now determined by the distance between the intermediate roller 240 and the drive wheel (not shown).

It can be seen from the foregoing examples that the selective engagement of the intermediate rollers 240 thus allows the turning radius of the pallet truck 100 to be reduced, whether or not the pallet truck is loaded, and even when the fork assembly 130 is in a raised position. The dimensions of the intermediate roller 240, the linkage 230, and the extension of the piston of the hydraulic actuator 220 can be selected according to the specific application and dimensions of the fork assembly 130. It can further be seen that the intermediate roller assembly 200 can function and provide a shortened turning radius whether the pallet truck 100 is in a loaded or empty condition, thus improving maneuverability of the pallet truck 100 in any working condition.

Various embodiments of the present invention having been thus described in detail by way of example, it will be apparent to those skilled in the art that variations and modifications may be made without departing from the invention. The invention includes all such variations and modifications as fall within the scope of the appended claims. Throughout the specification, terms such as "may" and "can" are used interchangeably and use of any particular term should not be construed as limiting the scope or requiring experimentation to implement the claimed subject matter or embodiments described herein.

The invention claimed is:

1. A powered pallet truck comprising:
a head section including a drive unit and at least one drive wheel;
a fork assembly comprising at least one fork, each fork comprising at least one load wheel movable between a retracted position and an extended position, a first turning radius of the powered pallet truck on a work surface being determined by a distance between the at least one drive wheel and the at least one load wheel when the at least one load wheel is engaged with the work surface;
at least one intermediate roller disposed on the at least one fork between the at least one load wheel and the at least one drive wheel, the at least one intermediate roller being movable between an engagement position and a retracted position, a second turning radius of the powered pallet truck being determined by a distance between the at least one drive wheel and the at least one intermediate roller when in the engagement position;
a first hydraulic actuator pivotably coupled to an axle of the at least one load wheel to move the at least one load wheel between a retracted position and an extended position;
a second hydraulic actuator pivotably coupled to an axle of the at least one intermediate roller to move the at least one intermediate roller between the retracted position and the engagement position;
a hydraulic system providing a hydraulic pressure source; and
a diverter valve in communication with the hydraulic system and the first and second hydraulic actuators to selectively place either the first or second hydraulic actuator in fluid communication with the hydraulic pressure source.

2. The powered pallet truck of claim 1, wherein when the first hydraulic actuator is selected and actuated, the at least one load wheel is moved to the extended position and the at least one intermediate roller is in the retracted position; and when the second hydraulic actuator is selected and actuated, the at least one intermediate roller is in the engagement position and the at least one load wheel is in the retracted position.

3. The powered pallet truck of claim 2, wherein when neither the first hydraulic actuator nor the second hydraulic actuator is actuated, both the at least one load wheel and the at least one intermediate roller is in the retracted position.

* * * * *